United States Patent
Lee et al.

(10) Patent No.: US 11,271,688 B2
(45) Date of Patent: Mar. 8, 2022

(54) METHOD FOR UPLINK TRANSMISSION IN WIRELESS COMMUNICATION SYSTEM, AND DEVICE THEREFOR

(71) Applicant: LG Electronics Inc., Seoul (KR)

(72) Inventors: Hyunho Lee, Seoul (KR); Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 16/938,054

(22) Filed: Jul. 24, 2020

(65) Prior Publication Data

US 2020/0358563 A1    Nov. 12, 2020

Related U.S. Application Data

(63) Continuation of application No. 16/317,990, filed as application No. PCT/KR2017/008434 on Aug. 4, 2017, now Pat. No. 10,742,362.

(Continued)

(51) Int. Cl.
*H04L 1/18* (2006.01)
*H04L 5/00* (2006.01)

(52) U.S. Cl.
CPC .......... *H04L 1/1854* (2013.01); *H04L 1/1812* (2013.01); *H04L 1/1861* (2013.01); *H04L 1/1864* (2013.01); *H04L 5/0055* (2013.01)

(58) Field of Classification Search
CPC ... H04L 1/1854; H04L 1/1812; H04L 1/1861; H04L 1/1864; H04L 5/0055
See application file for complete search history.

(56) References Cited

U.S. PATENT DOCUMENTS

2014/0307597 A1* 10/2014 Kim ............... H04B 7/2643
                                                370/280
2014/0328292 A1* 11/2014 Yang ............. H04W 72/042
                                                370/329

FOREIGN PATENT DOCUMENTS

| CN | 102687451 | 9/2012 |
| CN | 103428882 | 12/2013 |
| WO | WO2015149862 | 10/2015 |

OTHER PUBLICATIONS

JP Office Action in Japanese Appln. No. 2019-507763, dated Jun. 22, 2021, 8 pages (with English translation).

(Continued)

*Primary Examiner* — Kashif Siddiqui
(74) *Attorney, Agent, or Firm* — Fish & Richardson P.C.

(57) ABSTRACT

According to one embodiment of the present invention, a method by which a terminal configured to have two or more processing times transmits a hybrid automatic repeat request-acknowledgment (HARQ-ACK) in a wireless communication system comprises the steps of: receiving, from a base station, a downlink control channel for indicating a downlink data channel, and the downlink data channel in one or more downlink subframes; and transmitting, to the base station, HARQ-ACK information on the downlink data channel in an uplink subframe corresponding to the one or more downlink subframes, wherein the HARQ-ACK information transmitted in the uplink subframe includes HARQ-ACK information on a downlink data channel in accordance with only one processing time among the two or more processing times, and cannot include HARQ-ACK information on a downlink data channel in accordance with the rest processing times.

20 Claims, 12 Drawing Sheets

Related U.S. Application Data

(60) Provisional application No. 62/479,245, filed on Mar. 30, 2017, provisional application No. 62/421,176, filed on Nov. 11, 2016, provisional application No. 62/417,317, filed on Nov. 3, 2016, provisional application No. 62/406,381, filed on Oct. 10, 2016, provisional application No. 62/401,839, filed on Sep. 29, 2016, provisional application No. 62/377,659, filed on Aug. 21, 2016.

(56) References Cited

OTHER PUBLICATIONS

LG Electronics, "Discussion on shortened processing time for FS2," R1-1609212, Presented at 3GPP TSG RAN WG1 Meeting #86bis, Lisbon, Portugal Oct. 10-14, 2016, 5 pages.
Samsung, "Overview of latency reduction operation with subframe TTI for FS2," R1-166693, Presented at 3GPP TSG RAN WG1 Meeting #86, Gothenburg, Sweden, Aug. 22-26, 2016, 4 pages.
CN Office Action in Chinese Appln. No. 201780045922.6, dated Jan. 25, 2021, 19 pages (with English translation).
ZTE, ZTE Microelectronics, "HARQ with shortened processing time for 1ms TTI," R1-1611455, 3GPP TSG RAN WG1 Meeting #87, Reno, USA, dated Nov. 14-18, 2016, 9 pages.
CATT, "HARQ and scheduling timing design for LTE processing timing reduction with 1ms TTI," R1-166454, 3GPP TSG RAN WG1 Meeting #86, Gothenburg, Sweden, Aug. 22-26, 2016, 3 pages.
Ericsson, "Handling overlapping allocations with short and 1 ms TTI," R1-167503, 3GPP TSG-RAN WG1 #86, Göteborg, Sweden, Aug. 22-26, 2016, 2 pages.
Ericsson, "Supported HARQ timings for 1ms TTI and reduced processing time," R1-167501, 3GPP TSG-RAN WG1 #86, Göteborg, Sweden, Aug. 22-26, 2016, 3 pages.
Ericsson, R1-167500, Asynchronous HARQ for PUSCH, 3GPP TSG RAN WG1 #86, Aug. 12, 2016. See sections 2.1-2.2 and figures 1-2 (Year: 2016).
Ericsson, R1-167501, Supported HARQ timings for 1 ms TTI and reduced processing time, 3GPP TSG RAN WG1 #86, Aug. 12, 2016. See sections 2.1-2.2 and figure 1 (Year: 2016).
Extended European Search Report in European Application No. 17843838.8, dated Jan. 24, 2020, 9 pages.
Intel Corporation, "On reducing processing time for 1ms TTI," R1-166540, 3GPP TSG-RAN WG1 #86, Göteborg, Sweden, dated Aug. 22-26, 2016, 3 pages.
PCT International Search Report and Written Opinion in International Appln. No. PCT/KR2017/008434, dated Nov. 16, 2017, 25 pages (with English translation).
Qualcomm Incorporated, "Shortened Processing Time for Downlink 1ms TTI," R1-166307, 3GPP TSG RAN WG1 #86, Gothenburg, Sweden, dated Aug. 22-26, 2016, 5 pages, XP051142327.
Samsung, "FDD DL HARQ-ACK feedback procedure for latency reduction with subframe TTI," R1-166696, 3GPP TSG RAN WG1 Meeting #86, Gothenburg, Sweden, Aug. 22-26, 2016, 3 pages.
Samsung, "TDD DL HARQ-ACK feedback procedure for latency reduction with subframe TTI," R1-166697, 3GPP TSG RAN WG1 Meeting #86, Gothenburg, Sweden, dated Aug. 22-26, 2016, 4 pages.
Samsung, R 1-166696, FDD DL HARQ-ACK feedback procedure for latency reduction with subframe TTI, 3GPP TSG RAN WG1 86, Aug. 13, 2016. See section 2.2 and figures 1-2 (Year: 2016).
www.3gpp.org - /ftp/tsg_ran/WG1_RL 1 /TSGR 1 _86/Docs/. Date Accessed by Examiner: Oct. 22, 2019. p. 8 referenced for NPL date of cited reference. (Year: 2016).
ZTE Corp, ZTE Microelectronics, "HARQ with shortened processing time for 1ms TTI," R1-167577, 3GPP TSG RAN WG1 Meeting #86, Gothenburg, Sweden, dated Aug. 22-26, 2016, 9 pages, XP051142275.

* cited by examiner

METHOD FOR UPLINK TRANSMISSION IN WIRELESS COMMUNICATION SYSTEM, AND DEVICE THEREFOR

CROSS-REFERENCE TO RELATED APPLICATIONS

This application is a continuation of U.S. application Ser. No. 16/317,990, filed on Jan. 15, 2019, now allowed, which is a U.S. National Patent Application and claims priority to International Application Serial No. PCT/KR2017/008434, filed on Aug. 4, 2017, which claims the benefit of U.S. Provisional Application No. 62/377,659, filed on Aug. 21, 2016, 62/401,839, filed on Sep. 29, 2016, 62/406,381, filed on Oct. 10, 2016, 62/417,317, filed on Nov. 3, 2016, 62/421,176, filed on Nov. 11, 2016 and 62/479,245, filed on Mar. 30, 2017, which are all hereby incorporated by reference herein in their entirety.

TECHNICAL FIELD

The present invention relates to a wireless communication system, and more particularly, to a method for uplink transmission and a device therefor.

BACKGROUND

Latency of packet data is one of the important performance metrics. Providing faster access to the Internet for the end users may be one of the important challenges not only to LTE but also to the design of a next-generation mobile communication system, which is called new RAT.

The present invention deals with uplink transmission such as HARQ feedback or uplink data transmission in a wireless communication system supporting reduction of latency.

SUMMARY

An object of the present invention devised to solve the problem lies in an uplink transmission method for reducing latency.

It will be appreciated by persons skilled in the art that the objects that could be achieved with the present disclosure are not limited to what has been particularly described hereinabove and the above and other objects that the present disclosure could achieve will be more clearly understood from the following detailed description.

The object of the present invention can be achieved by providing a method for transmitting hybrid automatic repeat request-acknowledgment (HARQ-ACK) in a wireless communication system, the method being performed by a terminal configured to have two or more processing times, the method including receiving, from a base station, a downlink control channel indicating a downlink data channel and the downlink data channel in one or more downlink subframes, and transmitting, to the base station, HARQ-ACK information about the downlink data channel in an uplink subframe corresponding to the one or more downlink subframe, wherein the HARQ-ACK information transmitted in the uplink subframe includes HARQ-ACK information about a downlink data channel according to only one processing time of the two or more processing times and does not include HARQ-ACK information about a downlink data channel according to the other processing times.

Additionally or alternatively, a minimum interval between the uplink subframe and the one or more downlink subframes corresponding to the uplink subframe may be three or fewer subframes.

Additionally or alternatively, when the number of the one or more downlink subframes corresponding to the uplink subframe is greater than or equal to a predetermined value, the HARQ-ACK information about the downlink data channel may be bundled.

Additionally or alternatively, when the number of the downlink subframes corresponding to the uplink subframe is greater than or equal to a predetermined value, the HARQ-ACK information about the downlink data channel may be transmitted through a specific physical uplink control channel (PUCCH) format.

Additionally or alternatively, an information set indicating the one or more downlink subframes corresponding to the uplink subframe may be configured for each of the processing times.

Additionally or alternatively, the information set may be determined according to HARQ-ACK load balancing or latency priority.

In another aspect of the present invention, provided herein is a terminal configured to transmit hybrid automatic repeat request-acknowledgment (HARQ-ACK) in a wireless communication system, the terminal including a transmitter and a receiver, and a processor configured to control the transmitter and the receiver, wherein the terminal is configured to have two or more processing times, wherein the processor is configured to receive, from a base station, a downlink control channel indicating a downlink data channel and the downlink data channel in one or more downlink subframes, and transmit, to the base station, HARQ-ACK information about the downlink data channel in an uplink subframe corresponding to the one or more downlink subframe, and wherein the HARQ-ACK information transmitted in the uplink subframe includes HARQ-ACK information about a downlink data channel according to only one processing time of the two or more processing times and does not include HARQ-ACK information about a downlink data channel according to the other processing times.

Additionally or alternatively, a minimum interval between the uplink subframe and the one or more downlink subframes corresponding to the uplink subframe may be three or fewer subframes.

Additionally or alternatively, when the number of the one or more downlink subframes corresponding to the uplink subframe is greater than or equal to a predetermined value, the HARQ-ACK information about the downlink data channel may be bundled.

Additionally or alternatively, when the number of the downlink subframes corresponding to the uplink subframe is greater than or equal to a predetermined value, the HARQ-ACK information about the downlink data channel may be transmitted through a specific physical uplink control channel (PUCCH) format.

Additionally or alternatively, an information set indicating the one or more downlink subframes corresponding to the uplink subframe may be configured for each of the processing times.

Additionally or alternatively, the information set may be determined according to HARQ-ACK load balancing or latency priority.

In another aspect of the present invention, provided herein is a method for transmitting uplink data in a wireless communication system, the method being performed by a terminal and including receiving a downlink control channel including an uplink grant from a base station in a downlink subframe, and transmitting, to the base station, uplink data indicated by the uplink grant in an uplink subframe corresponding to the downlink subframe, wherein, when the terminal is configured to have a shortened processing time, a minimum interval between the downlink subframe and the uplink subframe is three or fewer subframes.

Additionally or alternatively, when a second uplink grant having a processing time longer than the shortened processing time corresponding to the uplink subframe is received, uplink data indicated by the second uplink grant may not be transmitted.

Additionally or alternatively, an interval between the downlink subframe and the uplink subframe may be determined according to an index value in the uplink grant.

The above technical solutions are merely some parts of the embodiments of the present invention and various embodiments into which the technical features of the present invention are incorporated can be derived and understood by persons skilled in the art from the following detailed description of the present invention.

According to embodiments of the present invention, uplink transmission may be efficiently performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present invention, and are incorporated in and constitute a part of this specification, illustrate embodiments of the invention and together with the description serve to explain the principles of the invention.

DETAILED DESCRIPTION

Figure 1A:
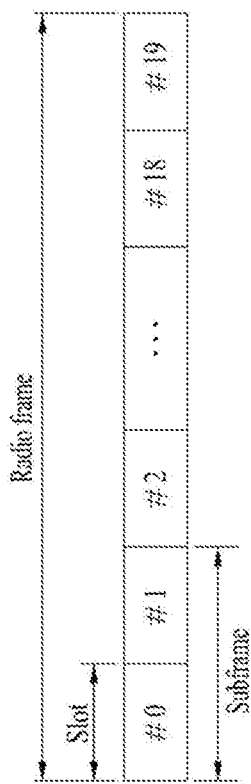
FIGS. 1A and 1B illustrate an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1B:
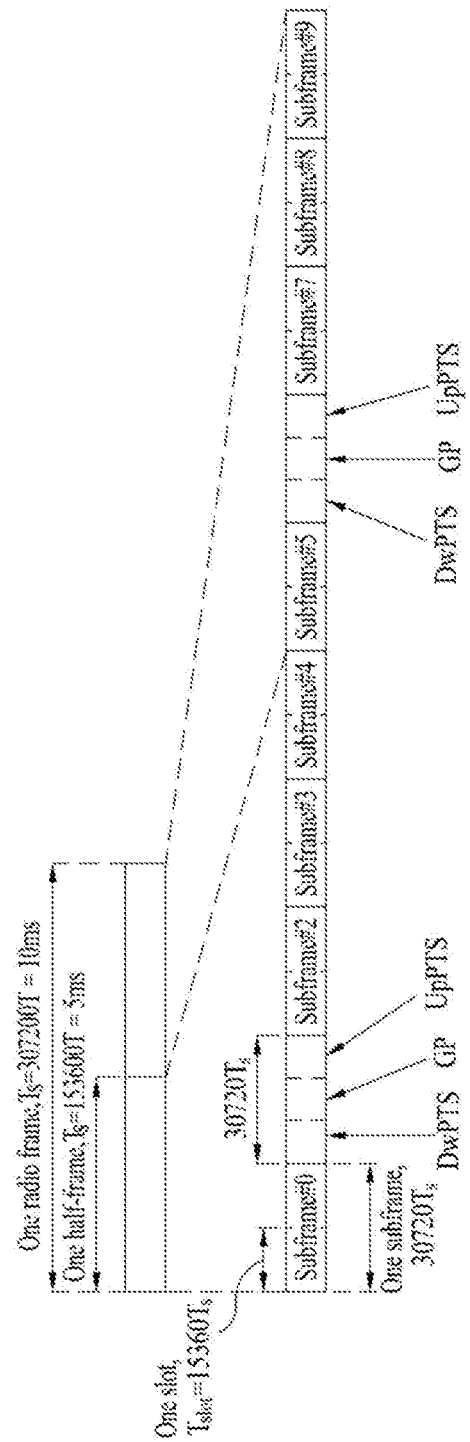

FIGS. 1A and 1B illustrate an exemplary radio frame structure used in a wireless communication system. FIG. 1A illustrates a frame structure for frequency division duplex (FDD) used in 3GPP LTE/LTE-A and FIG. 1B illustrates a frame structure for time division duplex (TDD) used in 3GPP LTE/LTE-A.

Referring to FIGS. 1A and 1B, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
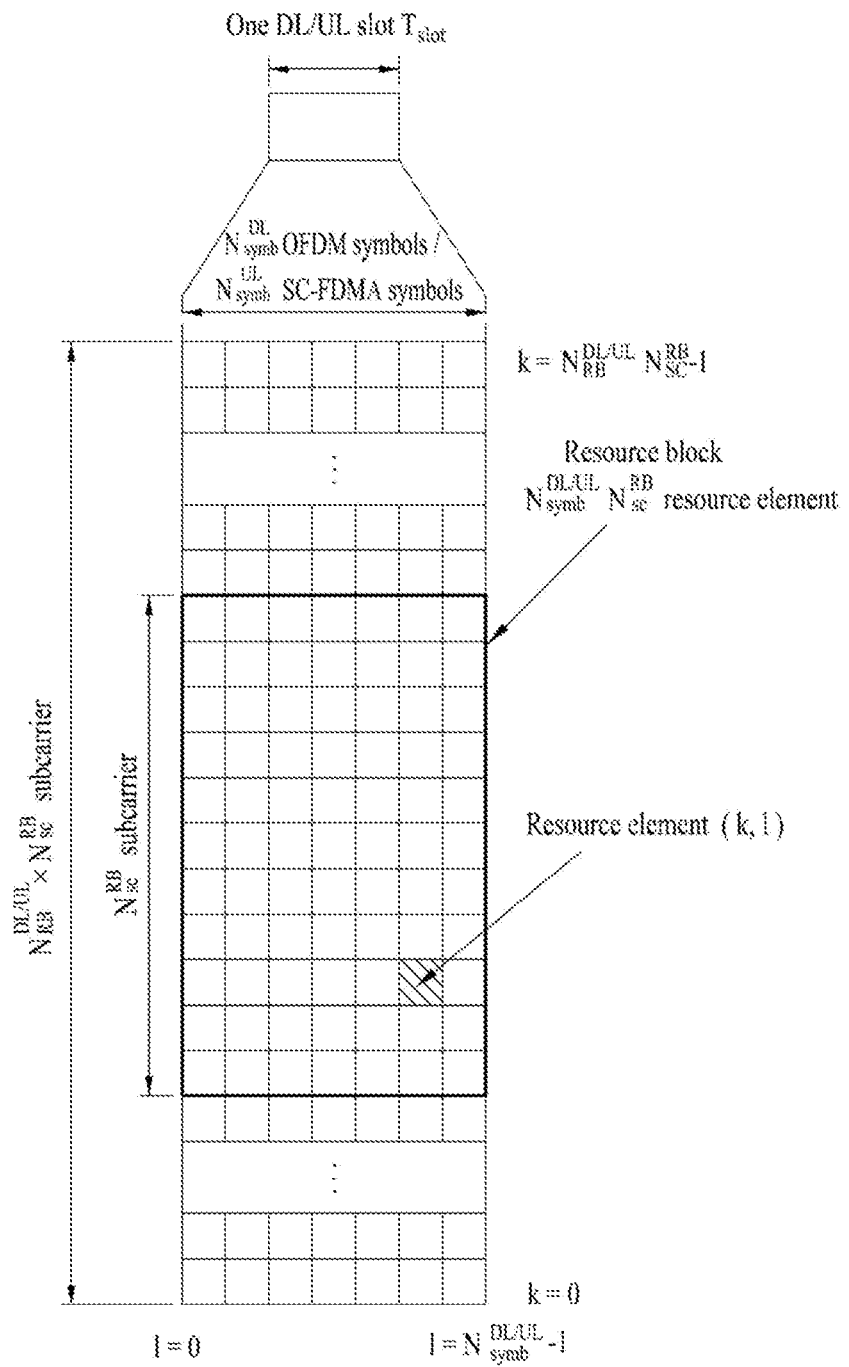
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
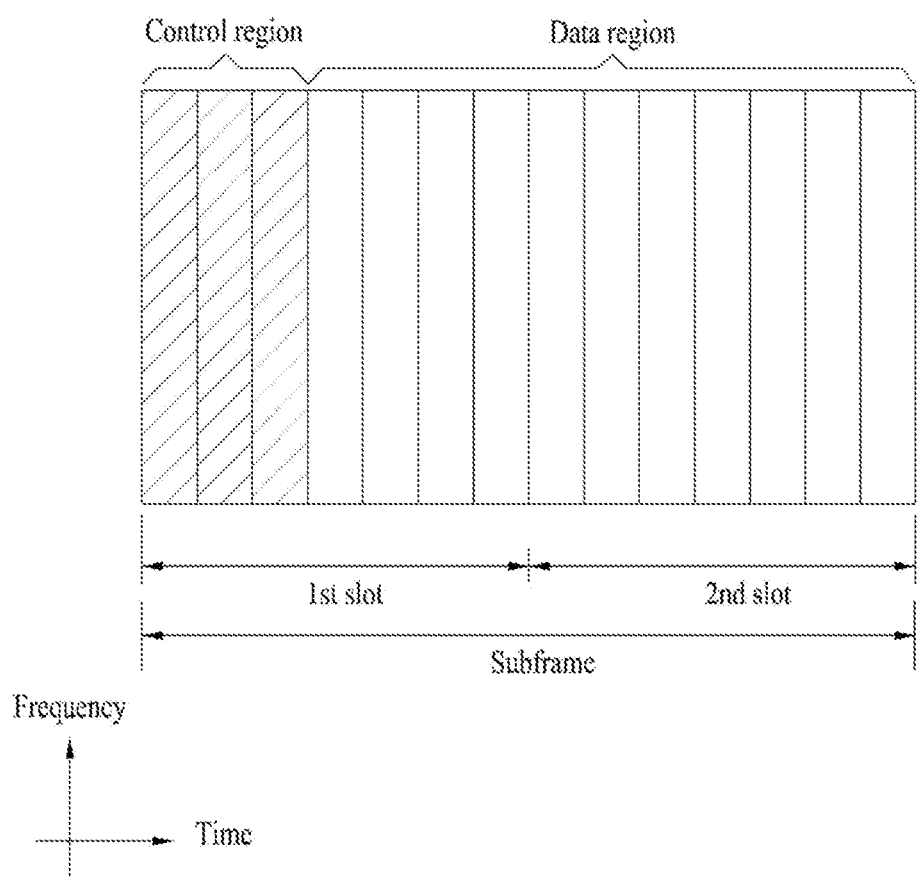
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four)

OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space $S_k^{(L)}$ | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
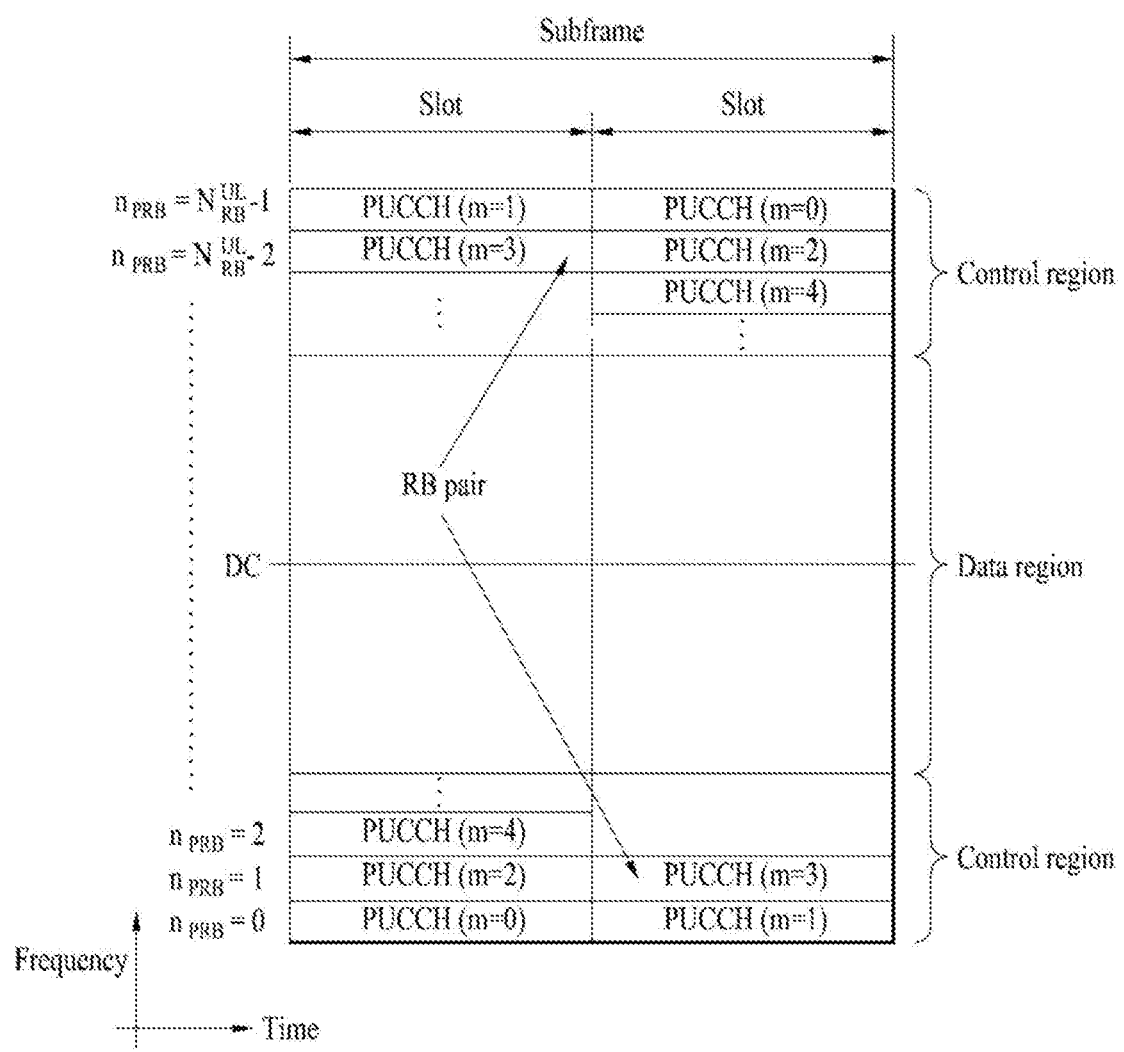
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Latency of packet data is one of the important performance metrics. Providing faster access to the Internet for the end users may be one of the important challenges not only to LTE but also to the design of a next-generation mobile communication system, which is called new RAT.

Recent standards of LTE have introduced several technologies such as carrier aggregation, and massive MIMO, higher modulation order in an effort to increase the data rate. However, reducing the processing time to improve the transmission control protocol (TCP) throughput while drastically reducing the latency of the user plane may be one of the key technologies. Recently, in the LTE standard, a method to reduce timing between DL reception and UL transmission of "UL grant-to-PUSCH" and "DL data-to-DL HARQ-ACK feedback" to reduce the processing time is under discussion.

The present invention proposes a scheme for performing HARQ-ACK feedback in a situation where reduction of the processing time is supported. The invention or the proposal disclosed herein is described based on LTE for simplicity, but the description is also applicable to other technologies such as new RAT in which a different waveform/frame structure is used. Although a specific TTI length is assumed in the embodiments of the present invention for simplicity, the present invention is also applicable to a different TTI length configuration (e.g., short TTI (sTTI) (<1 msec), longTTI (=1 msec), longerTTI (>1 msec)). For example, the sTTI may be introduced in the next-generation system in a manner in which the subcarrier spacing is increased. Here, the sTTI refers to a TTI that is shorter than the legacy TTI of 1 ms.

[Proposal 1] TDD UL Transmission Timing According to a Shortened Processing Time According to the current LTE Rel.-13 standard, after initial transmission of a PDCCH/PDSCH, the UE may receive the PDCCH/PDSCH and perform a procedure of detection and decoding (including blind decoding). There-after, the UE may perform a coding procedure for PUCCH or PUSCH transmission in order to transmit HARQ-ACK for the PDSCH, and perform the transmission by advancing the transmission timing for timing adjustment (TA). In the FDD system, the above-described procedures (hereinafter referred to as a processing time) are performed for 3 msec based on a normal TTI (i.e., a TTI consisting of 14 symbols), and therefore HARQ-ACK for the PDSCH transmitted in SF #n may be transmitted on the PUCCH or PUSCH in SF #n+4.

A UE supporting the shortened processing time may require a shorter time for the operation described above. Therefore, the HARQ-ACK for the PDSCH scheduled by a DL grant in subframe #n may be transmitted in subframe #n+k (where k is an integer less than 4).

However, in the TDD system, the DL subframe position and the UL subframe position (and the position of a special subframe composed of DwPTS, UpPTS and a guard period) are predefined according to the TDD DL-UL configurations of Table 1. Even in terms of the normal TTI, the timing at which the HARQ-ACK for a PDSCH is transmitted after the PDSCH is transmitted, or the timing at which a PUSCH is transmitted after the corresponding PDCCH for the UL grant is transmitted may not be based on 4 msec anymore, but may be assigned a greater value according to the TDD DL-UL configuration. Table 5 shows timing of DL HARQ-ACK transmission of the UE for the PDSCH in the TDD system defined in the LTE standard. For example, when the TDD DL-UL configuration is set to 2, the UE transmits, in subframe #n=2, HARQ-ACK for the PDSCHs received in subframes #n−8, #n−7, #n−4, and #n−6. Here, subframes #n−8, #n−7, #n−4, and #n−6 are referred to as a "DL association set" for the DL HARQ-ACK.

TABLE 5

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When the shortened processing time is supported, the earliest time at which HARQ-ACK for a specific PDSCH (e.g., a PDSCH transmitted in subframe #n) can be transmitted may be advanced (to, for example, subframe #n+2 or #n+3) compared to the conventional cases, and thus timing different from the conventional DL HARQ-ACK transmission timing may be defined. Accordingly, a new HARQ-ACK transmission scheme for the defined timing needs to be defined.

The transmission timing of the DL HARQ-ACK for the PDSCH received by the UE may be set differently according to a processing time that is predetermined or indicated through a higher layer/physical layer signal. Herein, the processing time may be construed as DL-to-UL Tx timing (e.g., timing at which HARQ-ACK is transmitted after the corresponding PDCCH/PDSCH transmission, timing at which an sPUSCH is transmitted after a corresponding UL grant), and/or UL-to-DL Tx timing (e.g., timing at which ACK or retransmission information is transmitted after a corresponding PUSCH is transmitted, timing at which the PDCCH is transmitted after the PUCCH transmission).

Figure 5:
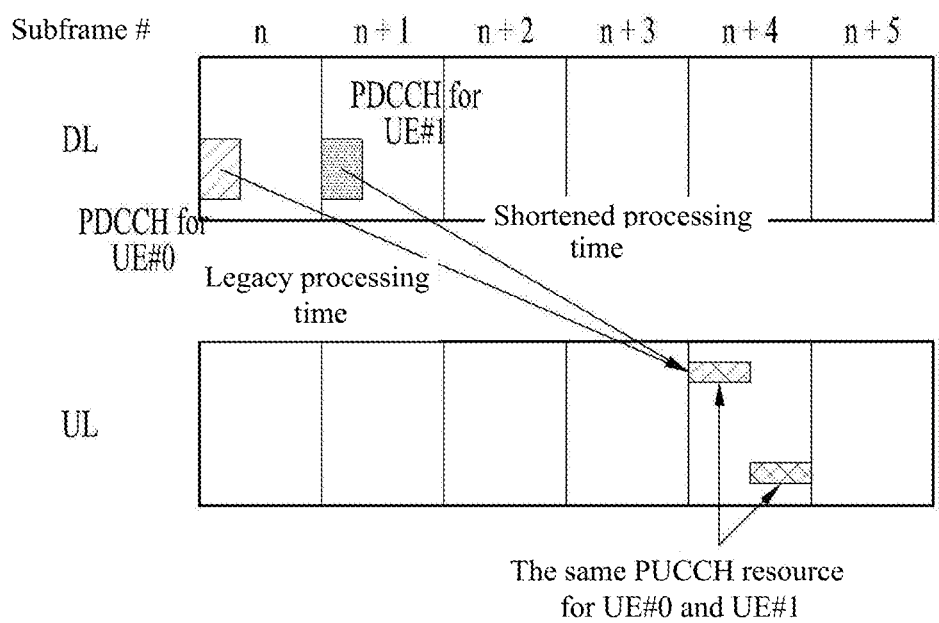
FIG. 5 illustrates conflict of PUCCH resources linked to PDCCHs received in different DL subframes in a TDD system.

Referring to FIG. 5, even if UE #0 operated by the legacy processing timing (e.g., 4 subframes) and UE #1 supporting shortened processing timing (e.g., 3 subframes) receive PDSCH scheduling by a DL grant in different subframes, there is a risk of conflict between PUCCH resources of the two UEs if the HARQ-ACK transmission timings for the corresponding DL grants overlap each other and indicate the same PUCCH resource (i.e., the two PDCCHs including the DL grant have the same lowest CCE index).

In order to prevent such PUCCH resource conflict, a DL association set for DL HARQ-ACK that is to be transmitted in a specific subframe under a specific TDD DL-UL configuration may be configured or defined differently by the processing time.

In the case where a DL association set determined by the legacy processing time and a DL association set determined by the shortened processing time are configured independently and differently for DL HARQ-ACK to be transmitted in a specific subframe under a specific TDD DL-UL configuration, a rule may be defined such that HARQ-ACK for the subframe(s) corresponding to the intersection of the sets conforms to a legacy PUCCH resource set, while HARQ-ACK for the subframe(s) which does not correspond to the intersection of the sets but are in the DL association set determined by the shortened processing time conforms to a separate PUCCH resource set. Here, the PUCCH resource set refers to a set consisting of PUCCH resources corresponding to all (E)CCEs in the DL association set.

Specifically, when the earliest timing at which the HARQ-ACK for a specific PDSCH can be transmitted in the TDD system is predetermined or configured through a higher/physical layer signal as subframe #n+3, the DL HARQ-ACK timing may be newly defined as shown in the following table.

TABLE 6

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 4, 6, 3 | — | — | — | — | 7, 4, 6, 3 | — | — |
| 3 | — | — | 7, 6, 5 | 5, 4 | 4, 3 | — | — | — | — | — |
| 4 | — | — | 8, 7, 11, 6 | 6, 5, 4, 3 | — | — | — | — | — | — |
| 5 | — | — | 12, 9, 8, 7, 5, 4, 11, 6, 3 | — | — | — | — | — | — | — |
| 6 | — | — | 6 | 4 | 4 | — | — | 6 | 3 | — |

For example, when the TDD DL-UL configuration 2 is established, the UE may transmit, in subframe #n=2, HARQ-ACK for the PDSCHs received in subframes #n−7, #n−4, #n−6, and #n−3. Subframe #n−3, which is a subframe within the shortened processing time and does not correspond to the intersection of a DL association set (e.g., subframes #n−8, #n−7, #n−4, and #n−6) determined by the legacy processing time and a DL association set (e.g., subframe #n−7, #n−4, #n−6, and #n−3) determined by the shortened processing time, conforms to a separate PUCCH resource set different from the PUCCH resource set determined by the DL association set determined by the legacy processing time.

Specifically, in the TDD system, when the earliest timing at which the HARQ-ACK for a specific PDSCH can be transmitted is predetermined or configured through a higher/physical layer signal as subframe #n+2, the DL HARQ-ACK timing may be newly defined as shown in the following table.

TABLE 7

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 4, 6, 3, 2 | — | — | — | — | 4, 6, 3, 2 | — | — |
| 3 | — | — | 7, 6, 5 | 5, 4 | 4, 3 | — | — | — | — | — |
| 4 | — | — | 8, 7, 5, 6 | 5, 4, 3, 2 | — | — | — | — | — | — |
| 5 | — | — | 9, 8, 7, 5, 4, 11, 6, 3, 2 | — | — | — | — | — | — | — |
| 6 | — | — | 3 | 3 | 3 | — | — | 2 | 2 | — |

For example, when the TDD DL-UL configuration 2 is established, the UE may transmit, in subframe #n=2, HARQ-ACK for the PDSCHs received in subframes #n−4, #n−6, #n−3, and #n−2. Subframe #n−2, which is a subframe within the shortened processing time and does not correspond to the intersection of a DL association set (e.g., subframes #n−8, #n−7, #n−4, and #n−6) determined by the legacy processing time and a DL association set (e.g., subframe #n−4, #n−6, #n−3, and #n−2) determined by the shortened processing time, conforms to a separate PUCCH resource set different from the PUCCH resource set determined by the DL association set determined by the legacy processing time.

When the shortened processing time is supported, the earliest time at which a PUSCH is to be transmitted after a corresponding PDCCH for a specific UL grant (e.g., the PDCCH transmitted in subframe #n) is transmitted may be advanced (to, for example, subframe #n+2 or #n+3) compared to the conventional cases, and therefore timing different from the legacy PUSCH transmission timing may be defined. Accordingly, a new PUSCH transmission scheme for the defined timing needs to be defined.

The PUSCH transmission timing of a UE for UL grant in the TDD system defined in the LTE standard is shown in the following table. In the case of TDD DL-UL configuration 0, the PUSCH transmission timing for a UL grant received in subframe #n is defined as subframe #n+k and/or subframe #n+7 according to a UL index value in the UL grant.

TABLE 8

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | 4 | | |
| 3 | 4 | | | | | | | 4 | 4 | |
| 4 | | | | | | | | 4 | 4 | |
| 5 | — | — | | | | | | 4 | | |
| 6 | 7 | 7 | | | 7 | 7 | | | | 5 |

The PUSCH transmission timing for a UL grant received by the UE at a specific point in time under a specific TDD DL-UL configuration may be predetermined or may be defined differently according to the processing time indicated through a higher layer/physical layer signal.

Specifically, when the earliest timing at which a PUSCH scheduled by a UL grant received at a specific time in the TDD system can be transmitted is predetermined or configured through a higher layer/physical layer signal as subframe #n+3, the PUSCH transmission timing may be newly defined as shown in the following table.

TABLE 9

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 3 | 3 | | | | 3 | 3 | | | |
| 1 | 3 | | | | 3 | 3 | | | | 3 |
| 2 | | | | 3 | | | | | | 3 |
| 3 | 3 | 3 | | | | | | | | 3 |
| 4 | 3 | | | | | | | | | 3 |
| 5 | | | | | | | | | | 3 |
| 6 | 4 | 6 | | | | 3 | 6 | | | 4 |

Specifically, when the earliest timing at which a PUSCH scheduled by a UL grant received at a specific time in the TDD system can be transmitted is predetermined or configured through a higher layer/physical layer signal as subframe #n+2, the PUSCH transmission timing may be newly defined as shown in one of the following tables.

TABLE 10

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 2 | 3 | | | | 2 | 3 | | | |
| 1 | 2 | 2 | | | 2 | 2 | | | | |
| 2 | 2 | | | 2 | | | | | | |
| 3 | 3 | 3 | | | | | | | | 3 |
| 4 | 2 | 2 | | | | | | | | |
| 5 | 2 | | | | | | | | | |
| 6 | 3 | 3 | | | | 2 | 2 | | | 3 |

TABLE 11

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 3 | 2 | | | | 3 | 2 | | | |
| 1 | 2 | 2 | | | 2 | 2 | | | | |
| 2 | | | 2 | | | | | | | |
| 3 | 3 | 3 | | | | | | | | 3 |
| 4 | 2 | 2 | | | | | | | | |
| 5 | 2 | | | | | | | | | |
| 6 | 3 | 3 | | | | 2 | 2 | | | 3 |

A rule may be defined such that PUSCH transmission timing determined by a UL index in a UL grant received by the UE at a specific time under TDD DL-UL configuration 0 is predetermined/predefined or is set to a value (different from the conventional value) indicated through a higher layer/physical layer signal.

Specifically, the PUSCH transmission timing for UL grant received in subframe #n may be defined as subframe #n+k1 and/or subframe #n+k2 according to the UL index value in the UL grant, where k1 may be determined by the earliest timing at which a PUSCH scheduled by the UL grant received at a specific time (which is predetermined/predefined or determined according to the processing time indicated through a higher layer/physical layer signal) can be transmitted, and k2, which is less than the conventional value of 7, may be determined or set differently according to the value of n (or set to a constant regardless of the value of n).

Figure 6:
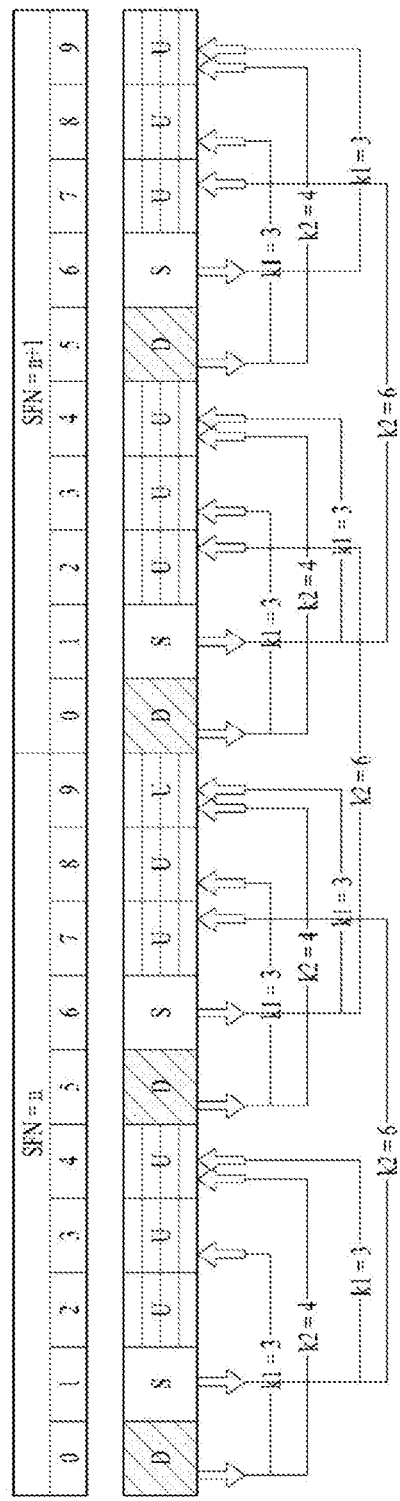
FIGS. 6 and 7 illustrate an example of PUSCH transmission according to a UL grant in the TDD system.

For example, when the rule above is applied, k1=3, k2=4 for n=0 and 5 and k2=6 for n=1 and 6, the PUSCH transmission scheduled by the UL grant received at a specific time may be defined as shown in FIG. 6.

Figure 7:
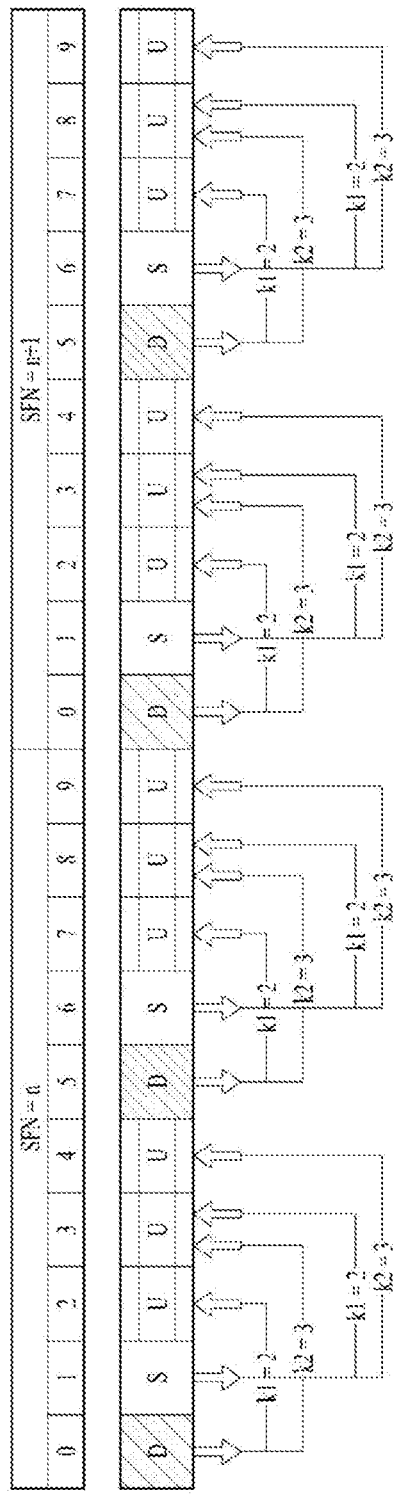

As another example, when the rule above is applied, k1=2 and k2=3, the PUSCH transmission timing scheduled by UL grant received at a specific time may be defined as shown in FIG. 7.

When the transmission timing of the PUSCH for a UL grant received by the UE at a specific time under a specific TDD DL-UL configuration is predetermined or set differently according to the processing time indicated through a higher layer/physical layer signal, the PUSCH transmission timings for a plurality of UL grants received at different times may overlap each other. In this case, the UE may assume that the entire corresponding PUSCH scheduling is invalid, or assume that the PUSCH scheduling for a specific UL grant is valid. Specifically, in the above-described case, an overriding operation may be defined, in which the UE considers the PUSCH scheduling for a UL grant having a shorter PUSCH transmission timing of the UE for the UL grant to be valid and ignores the PUSCH scheduling for a UL grant having a longer PUSCH transmission timing.

Even in the FDD system, when the transmission timing of the PUSCH for a UL grant received by the UE at a specific time is predetermined or set differently according to the processing time indicated through a higher layer/physical layer signal, the PUSCH transmission timings for a plurality of UL grants received at different times may overlap each other. For example, when DL-to-UL Tx timing for a UL grant received in subframe #n is set to 4 ms, DL-to-UL Tx timing for a UL grant received in subframe #n+1 is set to 3 ms, the PUSCH transmission timings for the two UL grants may overlap as subframe #n+4. In this case, the UE may assume that the entire PUSCH scheduling is invalid, or assume that the PUSCH scheduling for a specific UL grant is valid. Specifically, in the above-described case, an overriding operation may be defined, in which the UE considers the PUSCH scheduling for a UL grant having a shorter PUSCH transmission timing of the UE for the UL grant to be valid and ignores the PUSCH scheduling for a UL grant having a longer PUSCH transmission timing.

Further, for a UE for which enhanced interference mitigation & traffic adaptation (eIMTA) is configured, the TDD DL-UL configuration on system information block 1 (SIB1) may be different from the TDD DL-UL configuration indicated by the reconfiguration DCI. In order to eliminate ambiguity of DL HARQ timing, eimta-HARQ-ReferenceConfig-r12 may be configured, and thus the DL HARQ timing and the PUCCH resource may be configured to be different from each other. The following table shows a legacy eIMTA DL association set according to the LTE standard.

TABLE 12

| Higher layer parameter 'eimta-HARQ-ReferenceConfig-r12' | Higher layer parameter 'subframeAssignment' | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 6 | — | — | 6, 8, 4 | — | — | — | — | 8, 6, 4 | — | — |
| 4 | 0 | — | — | 12, 7, 11, 8 | 7, 4, 5, 6 | — | — | — | — | — | — |
| | 1 | — | — | 12, 8, 11 | 7, 5, 6 | — | — | — | — | — | — |
| | 3 | — | — | 12, 8 | 4, 7 | — | — | — | — | — | — |
| | 6 | — | — | 12, 11, 8 | 4, 5, 6 | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 6 | — | — | 13, 12, 11, 6, 8, 4, 9, 5 | — | — | — | — | — | — | — |

Therefore, for a UE for which eIMTA is configured, a DL association set for DL HARQ-ACK to be transmitted in a specific subframe under a specific TDD DL-UL configuration may be configured or defined differently by the processing time. Specifically, in the TDD system, when the earliest timing at which HARQ-ACK for a specific PDSCH can be transmitted is predetermined or configured through a higher layer/physical layer signal as subframe #n+3, the eIMTA DL association set may be newly defined as shown in the following table.

TABLE 13

| Higher layer parameter 'eimta-HARQ-ReferenceConfig-r12' | Higher layer parameter 'subframeAssignment' | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 6, 3, 4 | — | — | — | — | 7, 6, 3, 4 | — | — |
| | 1 | — | — | 7, 4 | — | — | — | — | 7, 4 | — | — |
| | 6 | — | — | 7, 3, 4 | — | — | — | — | 7, 3, 4 | — | — |
| 4 | 0 | — | — | 7, 6, 11, 8 | 4, 6, 5 | — | — | — | — | — | — |
| | 1 | — | — | 8, 7, 11 | 4, 6, 5 | — | — | — | — | — | — |
| | 3 | — | — | 11, 8 | 6, 3 | — | — | — | — | — | — |
| | 6 | — | — | 7, 11, 8 | 3, 6, 5 | — | — | — | — | — | — |
| 5 | 0 | — | — | 12, 7, 6, 11, 3, 8, 4, 5, 9 | — | — | — | — | — | — | — |
| | 1 | — | — | 12, 8, 7, 11, 4, 5, 9 | — | — | — | — | — | — | — |
| | 2 | — | — | 12, 9, 8, 11, 5 | — | — | — | — | — | — | — |
| | 3 | — | — | 12, 4, 3, 11, 8, 9 | — | — | — | — | — | — | — |
| | 4 | — | — | 12, 5, 4, 3, 9 | — | — | — | — | — | — | — |
| | 6 | — | — | 12, 7, 3, 11, 8, 4, 5, 9 | — | — | — | — | — | — | — |

Figure 8:
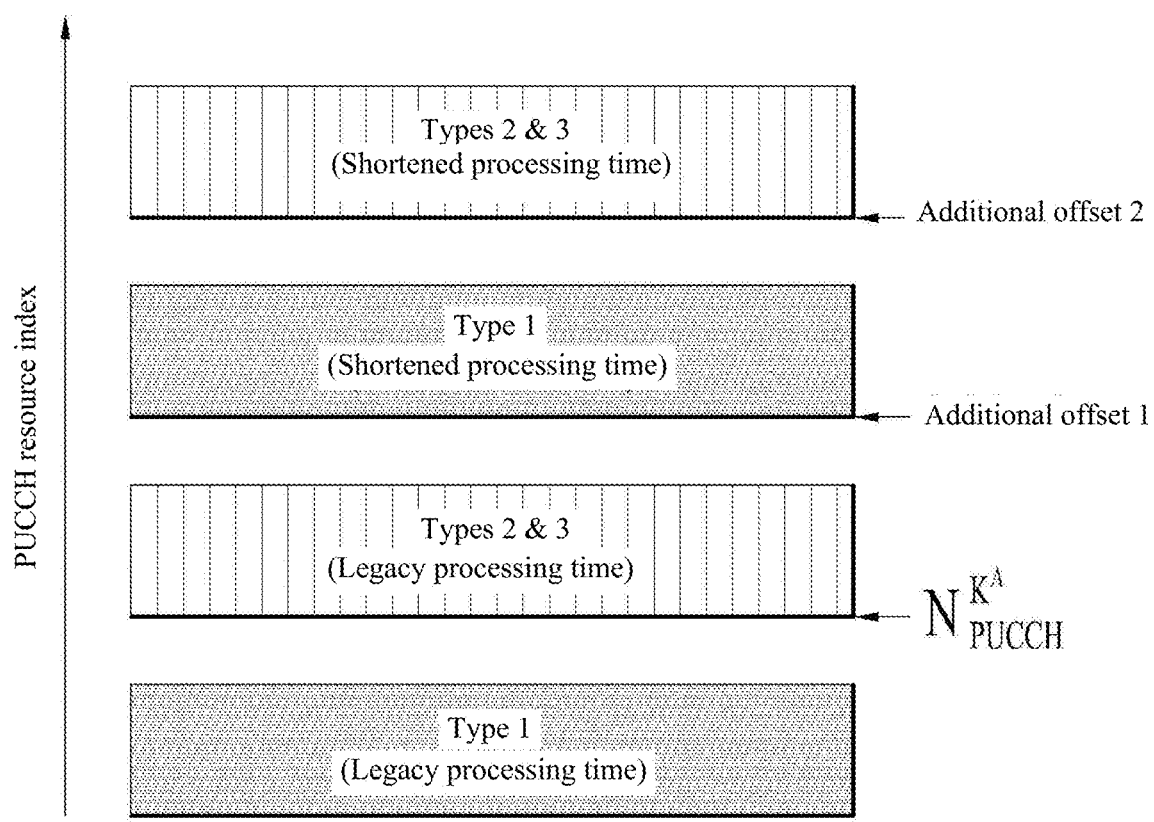
FIGS. 8, 9, and 10 illustrate PUCCH resources for DL HARQ based on a resource offset according to a subframe type and/or a processing time.

Specifically, in the TDD system, when the earliest timing at which HARQ-ACK for a specific PDSCH can be transmitted is predetermined or set through a higher layer/physical layer signal as subframe #n+3, the eIMTA DL association set may be newly defined as shown in the following table.

the DL HARQ for the Type 1 and Type 2/3 subframes corresponding to the shortened processing time are selected based on separate resource offsets configured for each of the resources as shown in FIG. 8. The resource offsets may be configured for separation from PUCCH resources of DL HARQ for Type 1 and Type

TABLE 14

| Higher layer parameter 'eimta-HARQ-ReferenceConfig-r12' | Higher layer parameter 'subframeAssignment' | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6, 3, 4 | — | — | — | — | 6, 3, 4 | — | — |
| | 1 | — | — | 6, 4 | — | — | — | — | 6, 4 | — | — |
| | 6 | — | — | 2, 6, 4 | — | — | — | — | 6, 3, 4 | — | — |
| 4 | 0 | — | — | 7, 6, 8, 5 | 3, 4, 5 | — | — | — | — | — | — |
| | 1 | — | — | 8, 7, 6, 5 | 4, 3, 5 | — | — | — | — | — | — |
| | 3 | — | — | 8 | 3, 2 | — | — | — | — | — | — |
| | 6 | — | — | 7, 6, 8, 5 | 4, 2, 5 | — | — | — | — | — | — |
| 5 | 0 | — | — | 7, 6, 11, 3, 8, 4, 9, 5 | — | — | — | — | — | — | — |
| | 1 | — | — | 8, 7, 6, 11, 4, 9, 5 | — | — | — | — | — | — | — |
| | 2 | — | — | 9, 8, 7, 11, 5 | — | — | — | — | — | — | — |
| | 3 | — | — | 4, 3, 2, 11, 8, 9 | — | — | — | — | — | — | — |
| | 4 | — | — | 4, 3, 2, 11, 9 | — | — | — | — | — | — | — |
| | 6 | — | — | 7, 2, 6, 11, 8, 4, 9, 5 | — | — | — | — | — | — | — |

Alternatively, a UE having received configuration of a shortened processing time does not expect an eIMTA configuration for all cells. Alternatively, a UE having received an eIMTA configuration even for any one cell may not expect a shortened processing time-related configuration for any cells. More specifically, a UE having received configuration of a shortened processing time for a specific cell does not expect an eIMTA configuration for any cell in the frequency band to which the cell belongs. Alternatively, a UE having received an eIMTA configuration for a specific cell in a specific frequency band does not expect a shortened processing time-related configuration for the specific cell.

As the processing times are diversified, PDCCHs/PDSCHs (or short PDCCHs (sPDCCHs)/short PDSCHs (sPDSCHs), which refer to PDCCHs/PDSCHs according to an sTTI) transmitted in different subframes or TTIs may transmit HARQ-ACK in the same SF or TTI. In this case, the PUCCH resource conflict may occur. In addition, the PUCCH resource conflict may more frequently occur for a UE for which an eIMTA configuration is possible. In order to address this issue, the following schemes may be considered as PUCCH resource allocation methods for an eIMTA UE which may receive configurations of the legacy processing time and the shortened processing time. For simplicity, for example, a Type 1 subframe indicates a fixed subframe in which the non-eIMAT UE and the eIMTA UE have the same DL HARQ timing, a Type 2 subframe indicates a fixed subframe in which the non-eIMTA UE and the eIMTA UE have different DL HARQ timings, and a Type 3 subframe indicates a flexible subframe. Here, the fixed subframe refers to a subframe whose usage according to the TDD DL-UL configuration is fixed to D, U, or S and is not changeable. The flexible subframe refers to a subframe whose usage is changeable according to the TDD DL-UL configuration.

Alt 1: According to the current standard, in order to separate the PUCCH resources of Type 1 and Type 2/3 subframes, a rule may be defined such that a higher-layer-signaled offset is set and the PUCCH resources of the Type 2/3 subframes are selected based thereon. A rule may be defined such that the PUCCH resources of 2/3 subframes corresponding to the legacy processing times. Specifically, the resource offset may be configured through a higher layer signal, or a resource offset configured through a higher layer signal may be finally indicated through DCI. Alternatively, a PUCCH resource may be determined by a combination of a resource offset configured through a higher layer signal or the DCI and a PDCCH transmission position (e.g., a CCE index and/or a frequency resource (PRB index)).

Alt 2-1: For PUCCH resources for a part of subframes of a specific type, a rule may be defined such that the same PUCCH resource is shared by the legacy processing time and the shortened processing time. Specifically, the subframes of the specific type may be Type 1 subframes. In the case of Type 2/3 subframes, a rule may be defined such that a resource is selected based on resource offsets configured for each of the subframes. The resource offset may be configured through a higher layer signal, or a resource offset configured through a higher layer signal may be finally indicated through DCI. Alternatively, a PUCCH resource may be determined by a combination of the resource offset configured through a higher layer signal or DCI and a PDCCH transmission position (e.g., a CCE index and/or a frequency resource (PRB index)).

Figure 9:
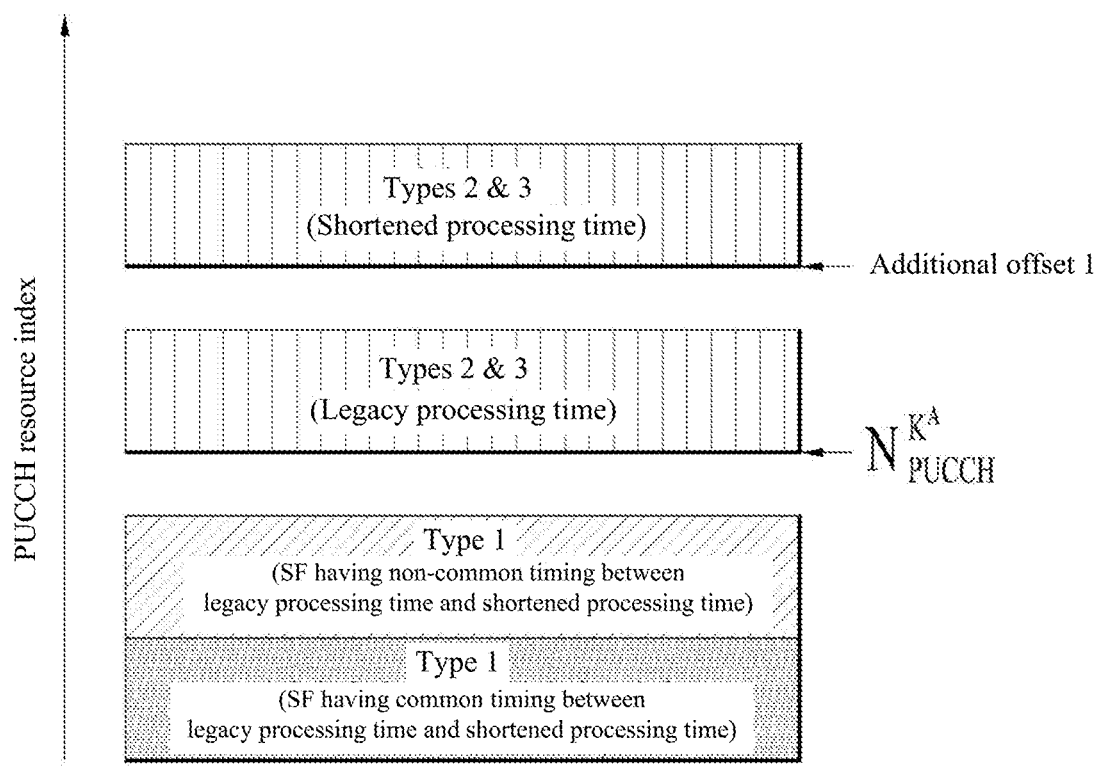

For example, when TDD DL-UL configuration 2 is established as shown in FIG. 9, the PUCCH resources of subframes #n−7, #n−4, and #n−6 corresponding to the intersection of a DL association set (e.g., subframes #n−8, #n−7, #n−4, and #n−6) determined by the legacy processing time and a DL association set (e.g., subframes #n−7, #n−4, #n−6, and #n−3) determined by the shortened processing time may be shared in subframe #n=2. As a PUCCH resource for subframe #n−3, a separate resource may be selected as described above. In the case of Type 2/3 subframes, a resource may be selected based on the resource offsets configured for the respective subframes to which the legacy processing time and the shortened processing time are applied.

Figure 10:
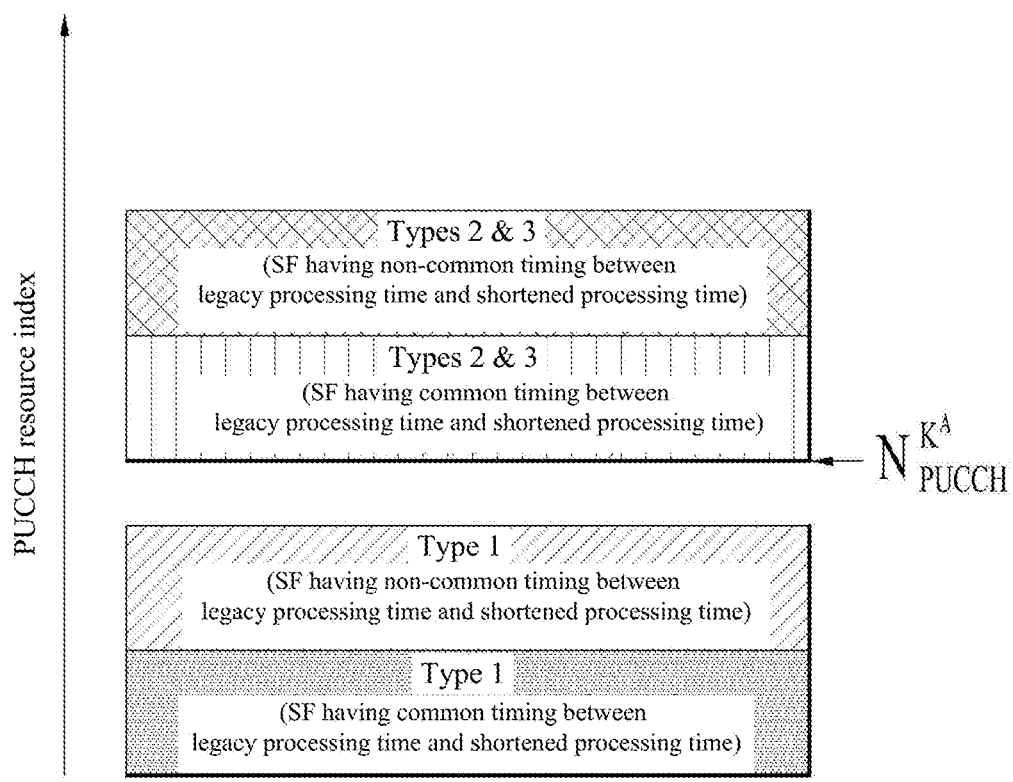

Alt 2-2: As a more general method for Alt 2-1, a rule may be defined such that, for PUCCH resources for some of subframes of the same type, the same PUCCH resource is shared between the legacy processing time and the shortened processing time. For example, as shown in FIG. 10, the PUCCH resources of the Type 1 subframes corresponding to the intersection of a DL association set determined by the legacy processing time and a DL association set determined by the shortened processing time may be shared. Similarly, the PUCCH resources of the Type 2/3 subframes corresponding to the intersection of the DL association set determined by the legacy processing time and the DL association set determined by the shortened processing time may also be shared. With this method, it is not necessary to assign a separate resource offset even when the shortened processing time is configured.

In the case where the shortened processing time is supported, DL HARQs for PDSCHs transmitted in a large number of DL subframes may be concentrated in one UL subframe. When PUCCH resources for an excessively large number of DL HARQs need to be reserved, the efficiency of resource utilization may be lowered. Therefore, a rule may be defined such that, when the number of DL subframes constituting a DL association set for one UL subframe is greater than or equal to a certain number (which is predetermined/predefined or signaled through a higher/physical layer signal), HARQ-ACK (spatial) bundling is applied.

Specifically, a rule may be defined such that the rule described above is applied only to UEs for which a shortened processing time is set. In addition, a rule may be defined such that the rule described above is applied only when the number of DL subframes constituting a DL association set for a specific UL subframe is greater than the number of DL subframes constituting a DL association set determined by the legacy processing time.

Alternatively, a rule may be defined such that, when the number of DL subframes constituting a DL association set for one UL subframe is greater than or equal to a certain number (that is predetermined/predefined or signaled through a higher/physical layer signal), DL HARQ is transmitted in PUCCH format 3/4/5 or a new PUCCH format that supports a larger payload.

Specifically, a rule may be defined such that the rule described above is applied only to UEs for which a shortened processing time is configured. In addition, a rule may be defined such that the rule described above is applied only when the number of DL subframes constituting a DL association set for a specific UL subframe is greater than the number of DL subframes constituting a DL association set determined by the legacy processing time. In the case where PUCCH resources for PUCCH formats 3/4/5 and/or a new PUCCH format are not predetermined/preconfigured, the rule described above may not be applied and a rule may be defined such that the DL HARQ transmission timing determined by the legacy processing is applied or the HARQ-ACK (spatial) bundling is applied.

In the TDD system, a downlink assignment index (DAI) may be included in a PDCCH to count and indicate the number of PDSCHs to be transmitted on the ACK/NACK resources of one UL subframe. For example, when one UL subframe corresponds to three DL subframes, PDSCHs to be transmitted during the interval of the three DL subframes may be sequentially assigned indexes (i.e., sequentially counted) and sent on a PDCCH for scheduling the PDSCHs, and the UE may determine whether the previous PDCCH has been correctly received based on the DAI information in the PDCCH.

There may be a plurality of processing times for a specific UE. Hereinafter, a first processing time, which is timing irrelevant to the shortened processing time configuration, may refer to a time interval between the reception or a configuration related to HARQ feedback or UL transmission through which DL HARQ feedback or UL data is transmitted in SF or TTI #n+4 when DL data or a UL grant is transmitted in SF or TTI #n and a transmission in FDD. In TDD, the first processing time, which is timing irrelevant to the shortened processing time configuration, may be at least 4 ms and may be a little longer than this value depending on the actual DL/UL subframe. A second processing time may be timing newly introduced according to the shortened processing time configuration. For example, in FDD, the second processing time may refer to a time interval between the reception or a configuration related to DL HARQ feedback or UL transmission through which DL HARQ feedback or UL data is transmitted in SF or TTI #n+3 when DL HARQ feedback or UL data is transmitted in SF or TTI #n according to transmission of DL data or a UL grant in SF or TTI #n and a transmission. In TDD, the second processing time may be at least 3 ms and may be longer than this value depending on the actual DL/UL SF. For a single cell, the first processing time may be used in a fallback operation (e.g., PDSCH/PUSCH scheduling through common search space (CSS) DCI and/or PDSCH scheduling through DCI format 1A or use of general RNTI), and the second processing time may be used when the shortened processing time is applied (e.g., PDSCH/PUSCH scheduling through UE-specific search space (USS) DCI and/or PDSCH scheduling through TM-dependent DCI or use of a third RNTI). In addition, in a carrier aggregation situation or dual connectivity situation, the second processing time may be used when the configuration of the shortened processing time operation varies among the cells. Alternatively, the second processing time may be used when different processing times are configured for a plurality of TTIs having different lengths.

For a UE for which a plurality of processing times are configured as described above, the same understanding of the DAI indication scheme may be required between the eNB and the UE. When a plurality of processing times are configured for the UE, a DAI transmission scheme is proposed as follows.

Alt 1: A rule may be defined such that the number of DL subframes or TTIs in which the PDSCH is scheduled with respect to a specific UL subframe or UL TTI in which DL HARQ is transmitted and the number of DL grants indicating DL SPS release do not exceed M, which is the number of elements of the DL association set.

For example, when TDD DL-UL configuration 2 is established and the first processing time is applied, the UE may transmit, in subframe #n=2, HARQ-ACKs for the PDSCHs received in subframes #n−8, #n−7, #n−4, and #n−6. On the other hand, when the second processing time is applied, the UE may transmit, in subframe #n=2, HARQ-ACKs for the PDSCHs received in subframes #n−7, #n−4, #n−6, and #n−3. Accordingly, M is defined as 4 in subframe #n=2.

In the case where subframes #n−8, #n−7, and #n−6 are scheduled by a DL grant to which the first processing time is applied (or which is performing the fallback operation), subframes #n−4 and #n−3 scheduled by a DL grant to which the second processing time is applied (or which is performing a shortened processing operation), M may be 5 in subframe #n=2. If the value of M is not allowed through scheduling, the UE does not expect such scheduling.

Alt 2: When subframes are scheduled by a DL grant to which the first processing time (or the second processing time) is applied in a subframe or TTI which is one of the elements of a DL association set determined by the first processing time (or the second processing time) with respect to a specific UL subframe or UL TTI in which DL HARQ is transmitted, a rule may be defined not to allow scheduling by a DL grant to which the second processing time (or the first processing time) is applied in another subframe or TTI that is one of the elements of another DL association set determined by the second processing time (or the first processing time).

Specifically, scheduling by the DL grant to which the second processing time (or the first processing time) is applied may not be allowed in a DL subframe or DL TTI that does not correspond to the intersection of the DL association set determined by the first processing time and the DL association set determined by the second processing time. For example, when TDD UL/DL configuration 2 is established and scheduling is performed by a DL grant to which the first processing time is applied in subframe #n−8, scheduling by a DL grant to which the second processing time is applied is not allowed in subframe #n−3.

A DL association set for a DL HARQ-ACK that is to be transmitted in a specific subframe under a specific TDD DL-UL configuration may be differently configured or defined by the processing time. Specifically, the DL association set may be defined such that DL HARQ is distributed to the respective UL subframes as equally as possible (hereinafter referred to as HARQ-ACK load balancing) or a delay corresponding to DL grant-to-DL HARQ-ACK transmission is minimized (hereinafter referred to as latency priority). For example, in the TDD system, when the earliest timing at which the HARQ-ACK for a specific PDSCH received in subframe #n can be transmitted is predetermined or configured through a higher layer/physical layer signal as subframe #n+3, an example of the HARQ-ACK load balancing for the DL HARQ-ACK timing is shown in Table 6, and an example of the latency priority for the DL HARQ-ACK timing is shown in the table below.

association set determined by the legacy processing time), specific methods for HARQ-ACK transmission are proposed below.

Alt 1: A rule may be defined such that the UE performs bundling according to each processing time after performing spatial bundling for each DL subframe.

Alt 2: A rule may be defined such that the UE performs bundling according to each codeword for HARQ-ACK for one UL subframe regardless of the processing time.

Alt 3: A rule may be defined such that the UE performs HARQ-ACK multiplexing regardless of the processing time.

Alt 4: The UE may perform HARQ-ACK transmission using a channel selection method after performing bundling according to each processing time. Alternatively, the UE may transmit HARQ-ACK using the channel selection method after performing spatial bundling for each DL subframe.

For example, in configuring a state of channel selection, HARQ-ACK information about a DL subframe corresponding to the DL association set defined by the legacy processing time may be mapped first, and then HARQ-ACK information about DL subframes that do not correspond to the intersection of two sets among the DL subframes corresponding to the DL association set defined by the shortened processing time may be sequentially mapped. Alternatively, HARQ-ACK information about DL subframes corresponding to the DL association set defined by the shortened processing time may be mapped first, and then HARQ-ACK information about DL subframes that do not correspond to the intersection of the two sets among the DL subframes corresponding to the DL association set defined by the legacy processing time may be sequentially mapped. Additionally, a separate DAI may be defined for each processing time.

Alt 5: HARQ-ACK transmission may be performed in PUCCH format 3/4/5 (or a new PUCCH format supporting a larger payload).

Here, a rule may be defined such that the HARQ-ACK information about a PDSCH scheduled by the shortened processing time is mapped first (or the HARQ-ACK information about a PDSCH scheduled by the legacy processing

TABLE 15

| DL-UL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 6, 4, 3 | — | — | — | — | 7, 4, 6, 3 | — | — |
| 3 | — | — | 7, 6, 5, 4, 3 | 3 | 3 | — | — | — | — | — |
| 4 | — | — | 11, 8, 7, 6, 5, 4, 3 | 3 | — | — | — | — | — | — |
| 5 | — | — | 12, 11, 9, 8, 7, 6, 5, 4, 3 | — | — | — | — | — | — | — |
| 6 | — | — | 6, 3 | 3 | 3 | — | — | — | 3 | — |

Specifically, for a UE for which a shortened processing time is configured, a rule may be defined such that whether to configure a DL association set using one of the HARQ-ACK load balancing and/or the latency priority and/or explicit indication of the HARQ-ACK timing is configured through a higher layer/physical layer signal.

In addition, when the number of DL subframes constituting a DL association set for one UL subframe is greater than or equal to a certain number (which is predetermined/predefined or signaled through a higher/physical layer signal) (particularly, when the number of DL subframes is greater than the number of DL subframes constituting a DL time is mapped first). Alternatively, the HARQ-ACK information may be mapped in a predefined order regardless of the processing time. For example, HARQ-ACK information about a DL subframe corresponding to the DL association set defined by the legacy processing time may be mapped first, and then HARQ-ACK information about DL subframes that do not correspond to the intersection of the two sets among the DL subframes corresponding to the DL association set defined by the shortened processing time may be sequentially mapped. Alternatively, HARQ-ACK information about DL subframes corresponding to the DL association set defined by the shortened processing time may be mapped first, and then HARQ-ACK information about DL subframes that do not correspond to the intersection of the two sets among the DL subframes corresponding to the DL association set defined by the legacy processing time may be sequentially mapped. Additionally, a separate DAI may be defined for each processing time.

A plurality of numerologies and/or TTI lengths and/or processing times may be configured for a specific UE. For example, in FDD, a first processing time, which is timing irrelevant to the shortened processing time configuration, may refer to a time interval between the reception or a configuration related to HARQ feedback or UL transmission through which DL HARQ feedback or UL data is transmitted in SF or TTI #n+4 according to reception (transmission) of DL data or a UL grant in SF or TTI #n and a transmission. In TDD, the first processing time may be at least 4 ms and may be a little longer than this value depending on the actual DL/UL subframe. A second processing time may be timing newly introduced according to the shortened processing time configuration. Alternatively, in a CA/DC situation, the numerology and/or TTI length and/or processing time may be configured differently for each cell.

In a situation where scheduling is performed with a plurality of numerologies and/or TTI lengths and/or processing times, a rule may be defined such that a DAI is assigned regardless of the numerologies and/or TTI lengths and/or processing times. Alternatively, a rule may be defined such that DAIS are independently assigned according to the respective numerologies and/or TTI lengths and/or processing times. Alternatively, DAIS may be independently assigned to the 1 ms TTI and the short TTI. For example, the PUSCH/PUCCH for the 1 ms TTI and the sPUSCH/sPUCCH for the 2-symbol TTI may be assigned separate DAIS, respectively.

Here, a rule may be defined such that DAIS are sequentially assigned in a transmission order of DL data channels (e.g., PDSCHs). The transmission times of DL data channels may be the same or overlap each other due to different numerologies and/or TTI lengths and/or processing times. In this case, the DAIs may be assigned by a predefined priority. Specifically, a rule may be defined such that the DAIs are sequentially assigned in the order of times at which DL grants are transmitted. Alternatively, a rule may be defined such that a DAI is assigned to a DL grant or DL data channel corresponding to a specific numerology and/or TTI length and/or processing time first.

Alternatively, a rule may be defined such that the DAIs are sequentially assigned in order of transmissions of DL assignment DCI.

Alternatively, a rule may be defined such that the DAIs are sequentially assigned in descending order of start positions of the DL allocation DCIs or the DL data channels (e.g., PDSCHs).

Alternatively, a rule may be defined such that DAIs are sequentially assigned in order of HARQ-ACK transmission timings. Specifically, the definition may be applied to a case where different TTI lengths are given.

As mentioned above, when subframes are scheduled by a DL grant to which the first processing time (or the second processing time) is applied in a subframe or TTI which is one of the elements of the DL association set determined by the first processing time (or the second processing time) with respect to a specific UL subframe or TTI in which DL HARQ-ACK is transmitted, a rule may be defined not to allow scheduling by a DL grant to which the second processing time (or the first processing time) is applied in another subframe or TTI that is one of the elements of another DL association set determined by the second processing time (or the first processing time).

More specifically, a rule may be defined such that a UE having received DL assignments (or DL grants) of different processing times that cause HARQ-ACK to be transmitted in a specific UL subframe excludes ACK/NACK feedback information for DL data corresponding to an element of a DL association set determined by a longer processing time and/or configure HARQ-ACK feedback including ACK/NACK feedback information about DL data corresponding to an element of a DL association set determined by a shorter processing time. This operation may be to prioritize scheduling for the shorter processing time. Specifically, the excluded/included ACK/NACK feedback information may be ACK/NACK feedback information about a DL subframe or DL TTI that does not correspond to the intersection of the DL association set determined by the first processing time and the DL association set determined by the second processing time.

Alternatively, a rule may be defined such that a UE having received DL assignments (or DL grants) of different processing times that cause HARQ-ACK to be transmitted in a specific UL subframe excludes ACK/NACK feedback information for DL data corresponding to an element of a DL association set determined by a shorter processing time and/or configure HARQ-ACK feedback including ACK/NACK feedback information about DL data corresponding to an element of a DL association set determined by a longer processing time.

It is apparent that the examples of the proposed schemes may be considered as proposed methods since they can be included in one of the methods for implementing the present invention. The described schemes may be implemented independently or in a combination thereof. A rule may be defined such that the eNB deliver, to the UE, information about whether the proposed methods are applied (or information on the rules of the proposed methods) are preannounced to the UE by the eNB through a predefined signal (e.g., a physical layer signal or a higher layer signal).

Figure 11:
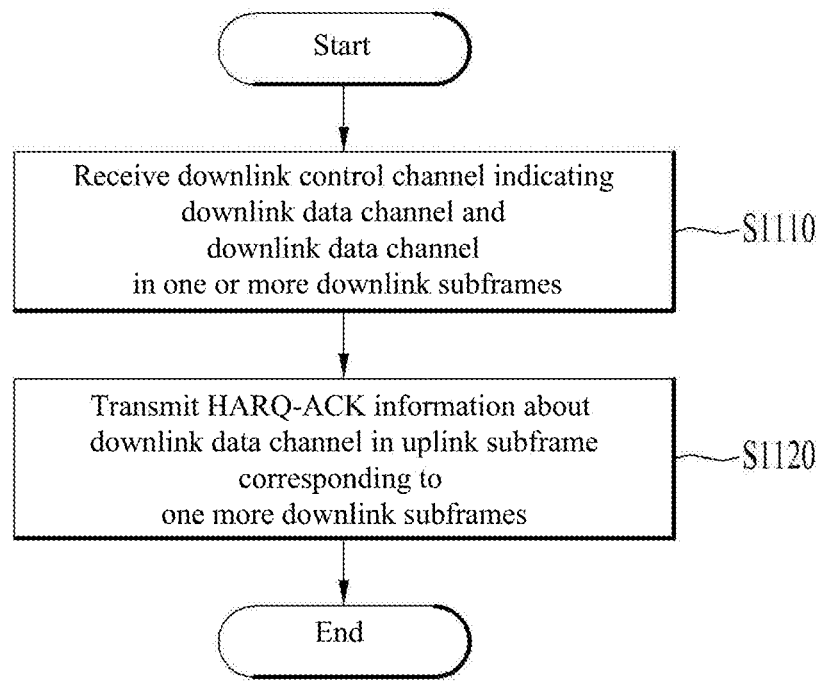
FIG. 11 illustrates operation of a UE according to an embodiment of the present invention.

FIG. 11 illustrates operation according to an embodiment of the present invention.

FIG. 11 illustrates a method for transmitting a hybrid automatic repeat request-acknowledgment (HARQ-ACK) in a wireless communication system. The method may be performed by a UE, and the UE may be configured to have two or more processing times. The UE may receive a downlink control channel indicating a downlink data channel and the downlink data channel from the base station in one or more downlink subframes (S1110). The UE may transmit, to the base station, HARQ-ACK information about the downlink data channel in an uplink subframe corresponding to the one more downlink subframes (S1120). The HARQ-ACK information transmitted in the uplink subframe may include HARQ-ACK information about a downlink data channel according to only one processing time of the two or more processing times, and may not include HARQ-ACK information about a downlink data channel according to the other processing times.

The minimum interval between the uplink subframe and the one or more downlink subframes corresponding to the uplink subframe may be three or fewer subframes.

When the number of the one or more downlink subframes corresponding to the uplink subframe is greater than or equal to a certain value, the HARQ-ACK information about the downlink data channel may be bundled. Additionally or alternatively, when the number of the downlink subframes corresponding to the one uplink subframe is greater than or equal to the certain value, the HARQ-ACK information about the downlink data channel may be transmitted through a specific physical uplink control channel (PUCCH) format.

An information set indicating one or more downlink subframes corresponding to the uplink subframe may be configured for each processing time. Here, the information set may be determined according to HARQ-ACK load balancing or latency priority.

Figure 12:
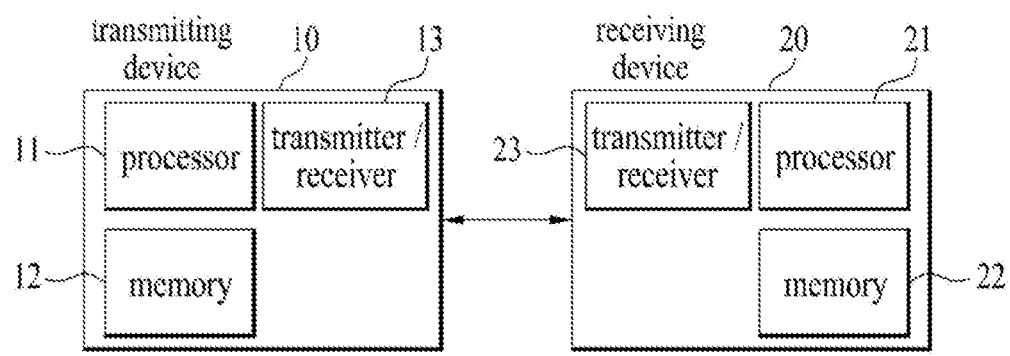
FIG. 12 is a block diagram of devices for implementing the embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

The present invention is applicable to wireless communication devices such as a terminal, a relay, and a base station.

What is claimed is:

1. A method for receiving, by a base station, hybrid automatic repeat request-acknowledgment (HARQ-ACK) from a user equipment, the method comprising:
    transmitting at least one physical downlink control channel (PDCCH) to the user equipment; and
    receiving, in an uplink subframe n, HARQ-ACK information based on the at least one PDCCH from the user equipment,
    wherein transmitting the at least one PDCCH to the user equipment comprises:
    transmitting the at least one PDCCH to the user equipment, based on the base station not allowed to transmit i) a first PDCCH in a first set of downlink subframes for which HARQ-ACK response is provided in the uplink subframe n and ii) a second PDCCH in a second set of downlink subframes for which HARQ-ACK response is provided in the same uplink subframe n, wherein the first set of downlink subframes is associated with the uplink subframe n based on a first processing time, and wherein the second set of downlink subframes is associated with the uplink subframe n based on a second processing time shorter than the first processing time, and not part of the first set of downlink subframes.

2. The method according to claim 1, wherein the HARQ-ACK information received in the uplink subframe n is related to only one of the first processing time and the second processing time.

3. The method according to claim 1, wherein receiving, in the uplink subframe n, the HARQ-ACK information associated the at least one PDCCH comprises:

based on the user equipment not configured with the second processing time, receiving the HARQ-ACK information based on i) at least one PDCCH in the first set of downlink subframes and ii) a first set of physical uplink control channel (PUCCH) resources related to the first set of downlink subframes; and based on the user equipment configured with the second processing time, receiving the HARQ-ACK information based on i) at least one PDCCH in a third set of downlink subframes and ii) a third set of PUCCH resources related to the third set of downlink subframes, wherein the third set of downlink subframes includes i) at least one downlink subframe belonging to the first set of downlink subframes and ii) the second set of downlink subframes, wherein the third set of PUCCH resources includes i) at least one first PUCCH resource based on the at least one downlink subframe belonging to the first set of downlink subframes and ii) at least one second PUCCH resource based on the second set of downlink subframes, and wherein the at least one first PUCCH resource belongs to the first set of PUCCH resources, and the at least one second PUCCH resource is different from the first PUCCH resource and does not belong to the first set of PUCCH resources.

4. The method according to claim 3, further comprising:
transmitting information regarding a PUCCH resource offset;
determining the first set of PUCCH resources related to the first set of downlink subframes based on the PUCCH resource offset; and
determining the at least one second PUCCH resource related to the second set of downlink subframes based on the same PUCCH resource offset.

5. The method according to claim 3, wherein the first processing time is four subframes, and the second processing time is three subframes.

6. The method according to claim 3, wherein, based on a number of downlink subframes in a corresponding set of downlink subframes associated with the uplink subframe n being greater than or equal to a predetermined value, the HARQ-ACK information based on the corresponding set of downlink subframes is bundled.

7. The method according to claim 3, wherein, based on a number of downlink subframes in a corresponding set of downlink subframes associated with the uplink subframe n being greater than or equal to a predetermined value, the HARQ-ACK information based on the corresponding set of downlink subframes is received in a specific PUCCH format.

8. A method for transmitting, by a user equipment, hybrid automatic repeat request-acknowledgment (HARQ-ACK) to a base station, the method comprising:

receiving at least one physical downlink control channel (PDCCH); and transmitting, in an uplink subframe n, HARQ-ACK information based on the at least one PDCCH, wherein receiving the at least one PDCCH comprises:

receiving the at least one PDCCH, based on not expecting to receive i) a first PDCCH in a first set of downlink subframes for which HARQ-ACK response is provided in the uplink subframe n and ii) a second PDCCH in a second set of downlink subframes for which HARQ-ACK response is provided in the same uplink subframe n, wherein the first set of downlink subframes is associated with the uplink subframe n based on a first processing time, and wherein the second set of downlink subframes is associated with the uplink subframe n based on a second processing time shorter than the first processing time, and not part of the first set of downlink subframes.

9. The method according to claim 8, wherein the HARQ-ACK information transmitted in the uplink subframe n is related to only one of the first processing time and the second processing time.

10. The method according to claim 8, wherein transmitting, in the uplink subframe n, the HARQ-ACK information based on the at least one PDCCH comprises:

based on the user equipment not configured with the second processing time, transmitting the HARQ-ACK information based on i) at least one PDCCH in the first set of downlink subframes and ii) a first set of physical uplink control channel (PUCCH) resources related to the first set of downlink subframes; and based on the user equipment configured with the second processing time, transmitting the HARQ-ACK information based on i) at least one PDCCH in a third set of downlink subframes and ii) a third set of PUCCH resources related to the third set of downlink subframes, wherein the third set of downlink subframes includes i) at least one downlink subframe belonging to the first set of downlink subframes and ii) the second set of downlink subframes, wherein the third set of PUCCH resources includes i) at least one first PUCCH resource based on the at least one downlink subframe belonging to the first set of downlink subframes and ii) at least one second PUCCH resource based on the second set of downlink subframes, and wherein the at least one first PUCCH resource belongs to the first set of PUCCH resources, and the at least one second PUCCH resource is different from the first PUCCH resource and does not belong to the first set of PUCCH resources.

11. The method according to claim 10, further comprising:
receiving information regarding a PUCCH resource offset;
determining the first set of PUCCH resources related to the first set of downlink subframes based on the PUCCH resource offset; and determining the at least one second PUCCH resource related to the second set of downlink subframes based on the same PUCCH resource offset.

12. The method according to claim 10, wherein the first processing time is four subframes, and the second processing time is three subframes.

13. A base station for receiving hybrid automatic repeat request-acknowledgment (HARQ-ACK) from a user equipment, the base station comprising:
   at least one transceiver;
   at least one processor; and
   at least one computer memory storing at least one program that causes the at least one processor to perform operations comprising:
   transmitting at least one physical downlink control channel (PDCCH) to the user equipment; and
   receiving, in an uplink subframe n, HARQ-ACK information based on the at least one PDCCH from the user equipment,
   wherein transmitting the at least one PDCCH to the user equipment comprises:
   transmitting the at least one PDCCH to the user equipment, based on the base station not allowed to transmit i) a first PDCCH in a first set of downlink subframes for which HARQ-ACK response is provided in the uplink subframe n and ii) a second PDCCH in a second set of downlink subframes for which HARQ-ACK response is provided in the same uplink subframe n,
   wherein the first set of downlink subframes is associated with the uplink subframe n based on a first processing time, and
   wherein the second set of downlink subframes is associated with the uplink subframe n based on a second processing time shorter than the first processing time, and not part of the first set of downlink subframes.

14. The base station according to claim 13, wherein the HARQ-ACK information received in the uplink subframe n is related to only one of the first processing time and the second processing time.

15. The base station according to claim 13, wherein receiving, in the uplink subframe n, the HARQ-ACK information based on the at least one PDCCH comprises:
   based on the user equipment not configured with the second processing time,
   receiving the HARQ-ACK information based on i) at least one PDCCH in the first set of downlink subframes and ii) a first set of physical uplink control channel (PUCCH) resources related to the first set of downlink subframes; and
   based on the user equipment configured with the second processing time,
   receiving the HARQ-ACK information based on i) at least one PDCCH in a third set of downlink subframes and ii) a third set of PUCCH resources related to the third set of downlink subframes,
   wherein the third set of downlink subframes includes i) at least one downlink subframe belonging to the first set of downlink subframes and ii) the second set of downlink subframes,
   wherein the third set of PUCCH resources includes i) at least one first PUCCH resource based on the at least one downlink subframe belonging to the first set of downlink subframes and ii) at least one second PUCCH resource based on the second set of downlink subframes, and
   wherein the at least one first PUCCH resource belongs to the first set of PUCCH resources, and the at least one second PUCCH resource is different from the first PUCCH resource and does not belong to the first set of PUCCH resources.

16. The base station according to claim 15, wherein the operations further comprise:
   transmitting information regarding a PUCCH resource offset;
   determining the first set of PUCCH resources related to the first set of downlink subframes based on the PUCCH resource offset; and
   determining the at least one second PUCCH resource related to the second set of downlink subframes based on the same PUCCH resource offset.

17. A user equipment for transmitting hybrid automatic repeat request-acknowledgment (HARQ-ACK) to a base station, the user equipment comprising:
   at least one transceiver;
   at least one processor; and
   at least one computer memory storing at least one program that causes the at least one processor to perform operations comprising:
   receiving at least one physical downlink control channel (PDCCH); and
   transmitting, in an uplink subframe n, HARQ-ACK information based on the at least one PDCCH,
   wherein receiving the at least one PDCCH comprises:
   receiving the at least one PDCCH, based on not expecting to receive i) a first PDCCH in a first set of downlink subframes for which HARQ-ACK response is provided in the uplink subframe n and ii) a second PDCCH in a second set of downlink subframes for which HARQ-ACK response is provided in the same uplink subframe n,
   wherein the first set of downlink subframes is associated with the uplink subframe n based on a first processing time, and
   wherein the second set of downlink subframes is associated with the uplink subframe n based on a second processing time shorter than the first processing time, and not part of the first set of downlink subframes.

18. The user equipment according to claim 17, wherein the HARQ-ACK information transmitted in the uplink subframe n is related to only one of the first processing time and the second processing time.

19. The user equipment according to claim 17, wherein transmitting, in the uplink subframe n, the HARQ-ACK information based on the at least one PDCCH comprises:
   based on the user equipment not configured with the second processing time,
   transmitting the HARQ-ACK information based on i) at least one first PDCCH in the first set of downlink subframes and ii) a first set of physical uplink control channel (PUCCH) resources related to the first set of downlink subframes; and
   based on the user equipment configured with the second processing time,
   transmitting the HARQ-ACK information based on i) at least one second PDCCH in a third set of downlink subframes and ii) a third set of PUCCH resources related to the third set of downlink subframes,
   wherein the third set of downlink subframes includes i) at least one downlink subframe belonging to the first set of downlink subframes and ii) the second set of downlink subframes,
   wherein the third set of PUCCH resources includes i) at least one first PUCCH resource based on the at least one downlink subframe belonging to the first set of downlink subframes and ii) at least one second PUCCH resource based on the second set of downlink subframes, and wherein the at least one first PUCCH resource belongs to the first set of PUCCH resources, and the at least one second PUCCH resource is different from the first PUCCH resource and does not belong to the first set of PUCCH resources.

20. The user equipment according to claim 19, wherein the operations further comprise:
   receiving information regarding a PUCCH resource offset;
   determining the first set of PUCCH resources related to the first set of downlink subframes based on the PUCCH resource offset; and
   determining the at least one second PUCCH resource related to the second set of downlink subframes based on the same PUCCH resource offset.

* * * * *